United States Patent [19]

Geier

[11] Patent Number: 5,867,973
[45] Date of Patent: Feb. 9, 1999

[54] ROTARY MOWER ARM WITH REPLACEABLE, TWIN-EDGED, BI-FUNCTIONAL, DUAL-TAPERED, MULTI-POSITIONAL KNIFE BLADES

[76] Inventor: Horst W. Geier, 265 Bay Haven La., Southold, N.Y. 11971

[21] Appl. No.: 912,254

[22] Filed: Aug. 15, 1997

[51] Int. Cl.[6] .................................................. A01D 34/64
[52] U.S. Cl. .............................................. 56/295; 56/17.5
[58] Field of Search ........................... 56/295, 255, 7.5, 56/DIG. 17, DIG. 20

[56] References Cited

U.S. PATENT DOCUMENTS

| | | | |
|---|---|---|---|
| 3,482,380 | 12/1969 | Stair | 56/295 |
| 5,291,725 | 3/1994 | Meinerding | 56/295 |
| 5,438,819 | 8/1995 | Dallman | 56/295 |

*Primary Examiner*—Heather Shackelford
*Attorney, Agent, or Firm*—Richard A. Joel, Esq.

[57] ABSTRACT

A rotary mower includes a flanged, straight rotary mower arm with a plurality of spaced, cutting width related knife blades and suspension hooks. The knife blades are adjustable to various cutting widths and are angular in configuration with respect to the grass being cut. The angular blades are arranged to provide a recutting element to mulch the cut grass in addition to the primary cutting.

7 Claims, 2 Drawing Sheets

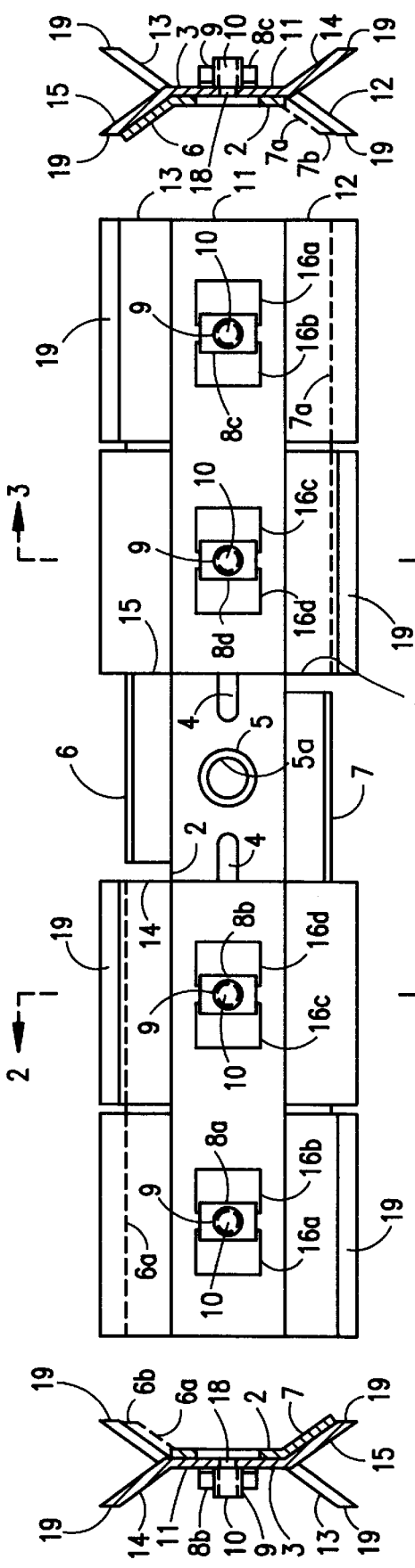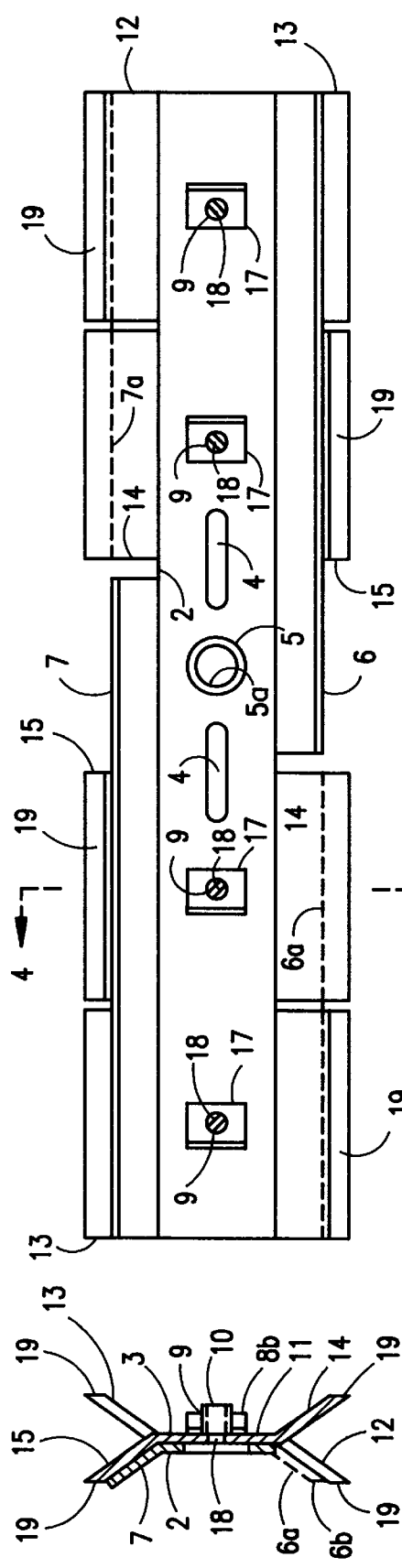

ROTARY MOWER ARM WITH REPLACEABLE, TWIN-EDGED, BI-FUNCTIONAL, DUAL-TAPERED, MULTI-POSITIONAL KNIFE BLADES

BACKGROUND OF THE INVENTION

The present invention relates primarily to rotary lawn mowers, and particularly to rotary mowers including means for adjusting their rotary knife blades to various cutting widths. The mower also includes a re-cutting element in addition to the primary cutting means. The new adjustable mower and knife blades assembly replaces the need for a large number of single component, conventional knife blade designs and sizes.

Due to the equal upward and downward angularity of the knife sections relative to the straight knife center portion, the cutting edges can be re-sharpened by firmly holding the angled end faces against a straight grinding surface in two set-ups for each knife blade. The new mower arm and knife blades assembly will have particular appeal to the lawn maintenance contractor whose single edged knife blades require re-sharpening at least once every week. Using the new, replaceable, twin-edged knife blade will either eliminate or greatly reduce re-sharpening with attendant time and cost factors. This is a significant advantage since sharpening is generally preferred over discarding the dull knives. Also, the majority of large size mowers do not mulch the grass clippings, which requires extra time for raking and removal. This invention recuts the grass into a suitable mulch.

The new mower arm is considerably stiffened by its outside flanges, which results in a reduction in material width, thickness and weight of both the mower arm and matching knife blades. The mower arm is also provided with the largest popular pivot center hole size. An additional set of snugly fitting center hole washers with a variety of concentric bore sizes will fit the mower arm to the vast majority of drive spindle adapter stud and bolt sizes. This adaptability is a further advantage of the invention.

SUMMARY OF THE INVENTION

This invention relates to rotary lawn mowers and particularly to rotary mowers including means for adjusting rotary knife blades to various cutting widths and having two recutting elements in addition to two primary cutting means.

The new adjustable rotary mower arm and knife blades assembly comprises a straight rotary mower arm of a predetermined length, width and material thickness with opposing, downward angled, overlapping flanges along the side of each mower arm. The mower arm has a pivot center hole for mounting the arm to the drive shaft of the move, a longitudinal drive pin clearance slot along the mower arm's center line on either side of the pivot center, and on each arm end, in symmetry with each other and equally spaced from the mower arm center, a pair of basically rectangular knife blades suspension hooks which are located along the mower arm's longitudinal center line with their gate entrances facing the mower arm's pivot center. The basically horizontal mower arm hook sections are equally spaced from each other in each hook set and provided with threaded screw holes and downward facing screw elements which are accessed from the mower arm bottom to clamp the knife blades to the top surface of the mower arm. Access to the downwardly facing screws is provided by clamping tool clearance holes in the knife blades' bridge sections which separate two adjacent suspension hook clearance holes. Straight cutting width related trailing edges are firmly seated against the straight inside of the suspension hook's vertical leg sections. The tool access holes are concentric with the hooks' larger screw holes. Centrifugal forces keep both knives in position, thus preventing any knife separation from the mower arm if the clamp screws become loose or lost.

The two twin-edged, bi-functional, dual-tapered, multi-positional knife blades are identical with each other in design and size. They are placed on the mower arm top and clamped against it with set screws tightened in counter-clockwise direction. Each knife features a flat, level center section with multiple sets of lengthwise extended, equally sized pairs of rectangular clearance holes of which the two first and second holes in each neighboring set are spaced at the same equal distance from each other as a matching mower arm hook. Provision is made for the knife blades' cutting width related engagement with their coordinated matching pairs of mower arm suspension hooks. The cutting width choices are determined by the number of corresponding clearance holes in each set pattern. The set on one knife blade side is located by the smallest cutting width increment closer to its nearest knife blade end than the hole set on the other side to the opposite knife blade end. The smallest incremental increase or decrease in cutting width requires each knife blade to be reversed end for end prior to its re-engagement with its corresponding pair of mower arm suspension hooks. Repositioning the knife blades in single step increments without their prior end for end reversal changes the cutting width twice as much.

The number of cutting width knife blade settings can be increased by enlarging the number of equally spaced holes in each clearance hole set and by proportionately lengthening the mower arm and knife blade length. The hook spacing in each hook pair, and each hook pair's distance from its respective mower arm end remains unchanged.

The uniform knife blade design also features a downward pitched, leading cutting leg and an equally sized, upwardly raised, trailing leg on its correlated, peripheral mower arm end, and a conversely angled, leading and trailing set of legs on the opposite knife blade end. The outside located knife sections cut and lift the grass and loose leaves while the inward faced knife sections re-cut the air borne material before releasing it onto the mowed lawn as organic fertilizer.

When the leading cutting edges become dull, the knife blades are turned 180° about their horizontal axis. This motion converts their sharp trailing edges into primary cutting and secondary mulching edges respectively. This lengthens the life of the knife blades at a reduced number of knife blade resharpenings.

In order to adapt the new mower arm and knife blades assembly to as many different lawn mower brands and sizes as possible, the mower arm is provided with the largest, most popular center hole together with a set of matching reducer washers featuring a variety of inner hole sizes to fit the most common mower drive shaft adapter stud and bolt sizes.

The overlapping mower arm flanges increase the arm stiffness, thus permitting a reduction in the width and weight of the mower arms and knife blades. The material thickness of the mower arms may also be reduced.

Additional rigidity may be given to the mower arm and equally angled, firmly seated leading primary knife blade sections by extending the flanges over the entire mower arm length. This flange support, which diminishes with greater than minimum cutting width settings, comes in addition to each knife's greater rigidity already provided by its four angled cutting sections. By shaping its downward facing edges at the same angle as each knife's primary cutting edges, the mower arm flanges can be converted into auxiliary primary cutting knives.

In summary, this new and improved adjustable mower arm and knife blade assembly offers the following main advantages over non-adjustable, single component rotary knife blades which constitute objects of this invention:

1. A combination of primary lawn cutting and re-cutting means for grass clippings;
2. A choice of multiple cutting width settings;
3. A substantial reduction in knife re-sharpenings, and thus a conversely longer life for the twin-edged knife section;
4. A simplified knife sharpening process;
5. A reduction in the lawn mower dealer's large and costly inventory of conventional lawn mower knife blades, which all differ in design and size from one another; and
6. A narrower and lighter flanged mower arm and lighter matching knife blades.

BRIEF DESCRIPTION OF THE DRAWINGS

The above and other objects and advantages of this invention may be more clearly seen when viewed in conjunction with the accompanying drawings wherein:

FIG. 1 is a top view of the rotary mower arm and knife blades assembly set up at their smallest cutting width;

FIG. 2 is a cross sectional view taken along the line 2—2 of FIG. 1;

FIG. 3 is a cross sectional view taken along the line 3—3 of FIG. 1;

FIG. 4 is a bottom view FIG. 1;

FIG. 5 is a cross sectional view taken along the line 4—4 of FIG. 4; and,

DETAILED DESCRIPTION OF THE INVENTION

Figure 6:
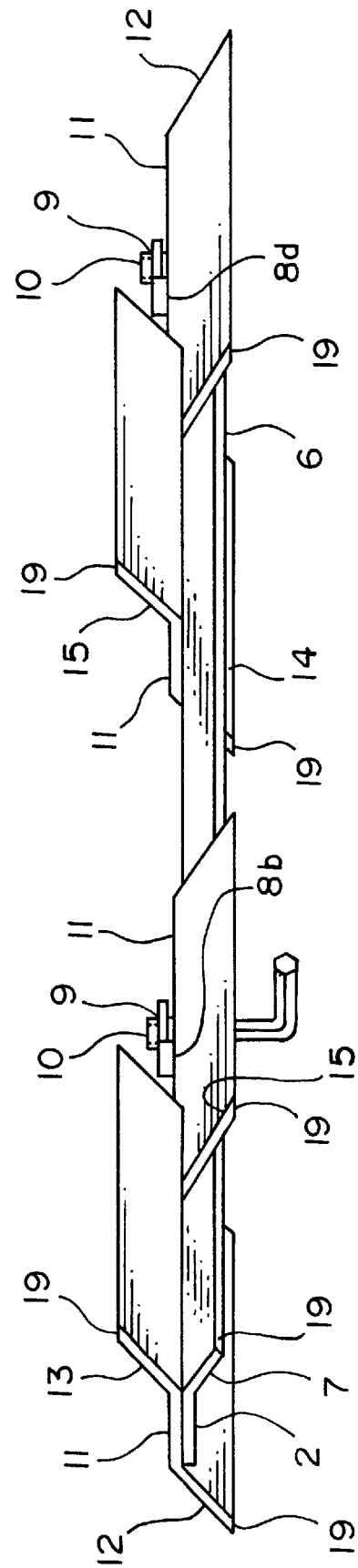
FIG. 6 is a perspective view of the mower arm.

Referring now to FIGS. 1–6 of the accompanying drawings, the invention relates to a new and versatile rotary mower assembly of a single, flanged mower arm 2 with two replaceable, twin-edged, bi-functional, dual-tapered, multi-positional knife blades 3.

The knife blades' supporting mower arm 2 has two longitudinal slots 4 which are designed to clear frequently used drive shaft adapter torque assist pins (not shown), a popular, large size center pivot hole 5, and a selection of spacer washer bushings 5a, whose constant outside diameter snugly matches the mower arm's center hole 5 and whose various concentric bore sizes match the drive shaft adapter's most common stud and bolt diameters.

The mower arm 2 also features two opposing and overlapping flanges 6 and 7, and alternative flange extensions 6a and 7a, and two pairs of rectangular knife blade suspension hooks 8a, 8b, 8c and 8d provided with threaded screw holes 9 and downwardly faced set screws 10 in their horizontal leg sections. Each suspension hook pair 8a and 8b, and 8c and 8d is spaced at an equal distance from the nearest mower arm end. The gate entrances of each suspension hook pair 8 are set in such manner that they face the mower arm's center pivot hole 5.

Each knife blade 3 comprises a flat, level center portion 11, a leading, downward sloped primary cutting leg section 12, trailed by an upwardly pitched, sharp edged leg section 13, and next to it an upwardly sloped leading recutting leg section 14, trailed by a sharp edged, downwardly pitched leg section 15. Each knife blade has also two pairs of rectangular suspension hook clearance holes 16a and 16b, and 16c and 16d along its centerline, of which each coordinated, outwardly located clearance hole pair 16a and 16c matches and clears the spacing of its correlated mower arm suspension hook pair 8a and 8b, and 8c and 8d respectively. The cutting width is set by adjusting the knife blades 3 with coordinated matching pairs of mower arm suspension hooks. In other words, the knife blades are moved outwardly along the elongated mower arm 2 increasing the cutting width. The cutting width choices are determined by the number of corresponding clearance holes 16a, 16b and 16c, 16d in each set pattern. In adjusting the cutting width, the knife blades 3 are reversed with the first setting as shown in FIGS. 1 and 2 with 16a and 16b close to the end of the mower arm 11, a second setting with 16d and 16c extending from the outer portion of the mower arm 4, a third setting with 16a and 16b at the outer end of the knife blade 3 extending from the outer portion of the mower arm 4 and a final cutting width extension where 16d and 16c extend at the outer end of the knife blade 3 from the outer portion of the mower arm 4. The spacing of each knife blade's pair of clearance holes 16a and 16b, and 16c and 16d is set at two cutting width increments. However, the left hand two hole pairs 16a and 16b, and 16c and 16d are located a single minimum cutting width increment closer to the left knife blade end than the right hand side clearance hole pair 16a and 16b, and 16c and 16d to the right hand knife blade end. This clearance hole arrangement offers four incremental minimum one-inch cutting width settings for each knife blade 3.

The next incremental cutting width increases over the narrowest setting shown in FIGS. 1 and 4 requires each knife blade 3 to be reversed end for end prior to engaging its inverted clearance holes 16d and 16b with the left hand mower arm hooks 8a and 8b, and the knife clearance holes 16d and 16b with the right hand mower arm hooks 8c and 8d as shown in FIGS. 1 and 4.

For the next larger cutting width setting, both knife blades 3 are again reversed end for end prior to engaging their inverted clearance holes 16b and 16d with the left hand mower arm hooks 8a and 8b, and the knife clearance holes 16b and 16d with the right hand mower arm hooks 8c and 8d.

In order to reach the always downwardly facing set screws 10 from below the knife blades' bridge sections 17 engaged in the mower arm's corresponding suspension hooks 8 are provided with clamping tool access holes 18 which are concentric with, but smaller in diameter than the suspension hooks' threaded screw holes 9. The set screws 10 are then engaged in these screw holes 9 with their head section facing downward. Clamping the knife blades 3 against the tool access holes 18 in the knives' bridge sections 17 is done by turning the set screws 10 counter-clockwise from the mower arm 2 underside.

The edges 6b and 7b of the mower arm flange extensions 6a and 7a have the same angularity as each knife blade's two downward sloped cutting edges 19.

While the invention has been explained by a detailed description of certain specific embodiments, it is understood that various modifications and substitutions can be made in any of them within the scope of the appended claims which are intended also to include equivalents of such embodiments.

What is claimed is:

1. In a rotary mower for cutting grass, the combination comprising:

a single mower arm; and a plurality of spaced cutting width adjustable (related) knife blades mounted to said arm at predetermined locations, said knife blades having an angular configuration with respect to a vertical and having a center portion mounted to the mower arm and a forward and a trailing edge each being tapered, said forward edge cutting the grass and said trailing edge mulching the cut grass.

2. In a rotary mower for cutting grass in accordance with claim 1, the combination wherein:

the mower arm comprises an elongated substantially rectangular body including outside longitudinal edges comprising a downwardly angled flange along each edge, a center pivot hole, a longitudinal torque assist pin clearance slot on each side of said pivot hole, and two pairs of lengthwise extending equally spaced knife blades mounted on each side of the pivot hole and alternately extending downwardly and upwardly at an angle.

3. In a rotary mower for cutting grass in accordance with claim 2, the combination wherein:

the mower arm includes a flange having a flat portion mounted to the arm and downwardly angled, opposing outside flange portions for additional arm stiffness and said flange portions forming auxiliary cutting knives with the same angle as the downwardly angled cutting blade sections.

4. In a rotary mower for cutting grass in accordance with claim 2, the combination wherein:

the mower arm's downwardly angled flange portions extend over the entire arm length, said flange portions having outer edges forming elongated auxiliary cutting knife blades and providing additional support for the downwardly angled cutting knife blades.

5. In a rotary mower for cutting grass in accordance with claim 3, the combination further including:

a mower arm suspension hook related to each clearance hole; and, wherein each knife blade comprises two pairs of pitched cutting sections each of opposing angularity, a flat center portion with multiple clearance hole sets, wherein each flat center portion between adjacent knife clearance holes has a clamping tool access hole, and one side of the multiple clearance hole pattern is spaced one minimum cutting width increment closer to one knife blade end than the other hole pattern side to the opposite knife blade end, and each clearance hole of one cutting width related hole pattern is spaced from the coordinated clearance hole in the neighboring hole pattern in such manner that each selected clearance hole pair matches and clears a corresponding mower arm suspension hook set at any of the multiple cutting width settings.

6. In a rotary mower for cutting grass in accordance with claim 5, the combination wherein:

the total number of correlated multiple clearance hole sets combined yield an equal number of cutting width settings.

7. In a rotary mower for cutting grass in accordance with claim 3, the combination wherein:

a plurality of mower arm suspension hooks are mounted to clearance holes to said arm, downwardly faced clamp screws, a mower arm underside and a knife blade clamp section for each knife blade having tool access holes which, after the hooks' engagement with a chosen pair of matching knife blade clearance holes are forced in counter-clockwise turns from the mower arm underside against the top surface of the tool access holes in each knife blade's clamp section.

* * * * *